United States Patent

McKay

[15] 3,691,116

[45] Sept. 12, 1972

[54] SYNTHETIC RESIN COMPOUNDS OF THE PHTHALOCYANINE SERIES

[72] Inventor: Robert Bruce McKay, Kilmarnock, Ayrshire, Scotland

[73] Assignee: Ciba-Geigy AG, Basel, Switzerland

[22] Filed: Aug. 12, 1970

[21] Appl. No.: 63,345

[30] Foreign Application Priority Data

Aug. 13, 1969 Great Britain ........ 40455/69

[52] U.S. Cl. ............ 260/18 N, 106/288 Q, 260/37 N
[51] Int. Cl. ..................... C08g 51/14, C08h 17/14
[58] Field of Search .............. 260/37 N, 18 N, 314.5; 106/288 Q; 8/1.3, 1.28

[56] References Cited

UNITED STATES PATENTS

| | | | |
|---|---|---|---|
| 3,301,846 | 1/1967 | Chiddix | 260/314.5 |
| 3,116,275 | 12/1963 | Gamlen | 260/314.5 |
| 3,148,933 | 9/1964 | Randall | 260/314.5 |
| 3,252,992 | 5/1966 | Drenchko | 260/314.5 |
| 3,336,332 | 8/1967 | Stein | 260/314.5 |
| 2,859,219 | 11/1958 | Randall | 260/314.5 |
| 3,336,147 | 8/1967 | Mitchell | 260/314.5 |

*Primary Examiner*—Morris Liebman
*Assistant Examiner*—P. R. Michl
*Attorney*—Wenderoth, Lind & Ponack

[57] ABSTRACT

New synthetic resin condensation products are prepared by condensing a chlormethylated copper phthalocyanine and a polyamide. The new polymers are used to improve the flocculation resistance of phthalocyanine pigments.

13 Claims, No Drawings

SYNTHETIC RESIN COMPOUNDS OF THE PHTHALOCYANINE SERIES

DETAILED DESCRIPTION

The present invention relates to the novel products of the reaction of chloromethylated phthalocyanines with reactive polymeric polyamides and to phthalocyanine pigments modified by the presence therein of those condensation products. The thus modified pigments have improved flocculation resistance.

Phthalocyanine pigments, especially copper phthalocyanine, by virtue of their low cost, high strength, brilliant shades and outstanding general fastness properties are of great commercial importance.

In paint and lacquer systems, however, these pigments in all their various forms suffer from a particular defect which is not shared by most other organic pigments. The defect in question manifests itself particularly in paints based on titanium dioxide or other white inorganic pigment and the phthalocyanine pigment, especially in non-aqueous systems. If such paints are applied under different conditions of shear, widely different strengths of shade are obtained. Similarly, when paints or printing inks containing phthalocyanine pigments are stored, the pigment particles tend to aggregate with resulting loss of tinctorial strength and homogeneity of the paint or ink.

Many attempts have been made to try and overcome this flocculation problem with varying degrees of success. Thus, for example, British Pat. specification No. 949,739 states that phthalocyanine pigment mixtures may be rendered resistant to flocculation by incorporating therein from 0.5 to 10 mole percent of a phthalocyanine methylene amine having the general formula:

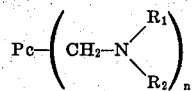

wherein $P_c$ represents a phthalocyanine radical, $R_1$ is hydrogen or an unsubstituted or substituted aliphatic hydrocarbon radical, $R_2$ is an unsubstituted or substituted aliphatic hydrocarbon radical, or, when taken together with $R_1$ a heterocyclic ring, and $n$ is a number from 1 to 4, preferably 3 or 4.

We have now found that by incorporating novel synthetic resin condensation products of chloromethylated phthalocyanine with reactive polyamides into the phthalocyanine pigment tending to flocculate, pigment compositions are produced having surprisingly excellent flocculation-resistance combined with other desirable pigmentary properties such as high tinctorial power.

Accordingly, the present invention provides polymeric phthalocyanine pigment derivatives made from condensation of a chloromethylated copper phthalocyanine and a polyamide having a least one reactive amino group.

The term "reactive amino group" as used herein means any amino group in the polymeric polyamide molecule which may enter into reaction with the chloromethylated phthalocyanine compound.

The chloromethylated phthalocyanine compounds used according to the invention may be obtained for example according to the procedure described in British Pat. specification No. 586,340. Advantageously, they contain a minimum of 5 percent by weight, based on the weight of the phthalocyanine, of chlorine atoms linked to the phthalocyanine nucleus through —CH$_2$— groups. More preferably, the proportion of such chlorine atoms is within the range of from 10 to 30 percent by weight based on the weight of the phthalocyanine residue.

The reactive polyamides used according to the invention may be condensation products of polymeric fatty acids with polyamines, preferably in such ratio that the resulting polyamide resins possess an amine value in the range of from about 250 to 650 milligrams potassium hydroxide per gram of resin. Polymeric fatty acids are advantageously represented by the reaction products obtained by polymerization of one or more unsaturated long chain aliphatic or aromatic-aliphatic acids or their esters or other derivatives easily converted into the acid. Suitable examples of such polymeric fatty acids are described in British Pat. Nos. 878,985 and 841,554. Polymeric fatty acids or esters used for the production of reactive polyamides may also be epoxidized, for example by reaction with peracetic acid performic acid or with hydrogen peroxide and formic acid or acetic acid. Suitable epoxidized fatty acids and esters are described in British Pat. Nos. 810,348 and 811,797.

As polyamines, which are employed for the preparation of the reactive polyamides, may be used aromatic polyamines or especially aliphatic polyamines which can also contain heterocyclic structures such as imidazolines.

Reactive polyamides may also be condensation products of polymeric fatty acids with polyamines described in British Pat. Nos. 726,570 and 847,028 which products may be reacted with epoxide resins derived by reaction from polyhydric phenols with polyfunctional halohydrins and/or glycerol dichlorhydrin and described in U.S. Pat. Nos. 2,585,115 and 2,589,245.

Also reactive polyamides form by condensation polymerization at high temperatures between a reaction mixture containing polymeric fatty acids (made in accordance with British Pat. Nos. 878,985 and 841,554) monomeric fatty acids and lower polyalkylene polyamines may be used according to the present invention.

Suitable reactive polyamide resins which may be used for the preparation of the polymeric phthalocyanine pigment derivatives according to the invention are described, for instance, in British Pat. Nos. 726,570, 810,348, 811,797, 847,028, 865,656 and 1,108,558, e.g., the compounds sold commercially as "Versamid 140," "Versamid 125," "Ancamide 400," "Beckalide K 189," "Casamid 167," "Casamid 185M," "Genamid 2000," "Genamid 250," "Synolide 960," "Merginamide L 410" and "Wolfamid No. 4." ("Ancamide,' "Beckalide," "Casamid," "Genamid," "Synolide,"c "Merginamide," "Versamid" and "Wolfamid" are Trade Marks.)

The condensation of chloromethyl copper phthalocyanines or mixtures thereof with appropriate reactive polyamides may be conveniently performed at a temperature ranging from 20° C to 150° C., although higher temperatures may be used.

Advantageously, the polyamide is employed in considerable excess over the stoichiometric proportion (calculated from the amine value) required to react with all of the chloromethyl groups in the chloromethylated phthalocyanine. The excess reactive polyamide is desirable in order to remove at once hydrogen chloride formed during the reaction of polyamide and chloromethylated phthalocyanine compound.

The polyamides may be used in solution in an organic solvent, which may for instance be an aliphatic alcohol or an aliphatic ketone. Suitable aliphatic alcohols are, for example, methanol, ethanol, isopropanol, n-butyl alcohol or amyl alcohol and suitable aliphatic ketones include acetone and methyl ethyl ketone. Tertiary bases such as pyridine and optionally halogenated or nitrated aromatic hydrocarbons such as benzene, trichlorobenzene or nitrobenzene may also be used as organic solvent.

The present invention also provides a pigment composition comprising a phthalocyanine pigment having the tendency to flocculate and a minor proportion of a polymeric phthalocyanine pigment derivative made from condensation of a chloromethylated copper phthalocyanine and a polyamide having at least one reactive amino group, as hereinbefore defined.

In addition to the essential components defined hereinbefore, the pigment composition of the invention may contain a minor proportion of chloromethylated phthalocyanine and reactive polyamide.

The pigment compositions of the present invention have good flocculation-resistance and may be obtained by intimately incorporating the phthalocyanine pigment tending to flocculate with from 2 to 20 percent by weight of the polymeric copper phthalocyanine derivative as hereinbefore defined. Incorporation of the above polymeric copper phthalocyanine derivative into the phthalocyanine pigment may be carried out by various methods.

However, isolation of the polymeric copper phthalocyanine derivatives is not a simple process. Therefore the flocculation-resistant pigment composition according to the invention is preferably produced by milling together, in a single stage process, a liquid mixture comprising a phthalocyanine pigment having the tendency to flocculate, a minor proportion of a chloromethylated copper phthalocyanine compound and a polyamide having at least one reactive amino group, as hereinbefore defined. This process has the considerable advantage that the polymeric phthalocyanine derivative need not be isolated. Further in the experiments carried out the resulting pigments had better performance in coating compositions than those produced by the addition of pre-prepared polymeric phthalocyanine derivative.

Any phthalocyanine pigment having a tendency to flocculate may be employed as a starting material in the process of the present invention. Thus the flocculating phthalocyanine may be unchlorinated or chlorinated, metal-free or metalliferous, the latter type containing such metals as nickel, cobalt or preferably copper. Of particular interest, however, is copper phthalocyanine or its chlorinated derivatives, containing from 0 to 10 percent chlorine, for instance the mon-chloro copper phthalocyanine and metal-free phthalocyanine.

Suitable chloromethylated copper phthalocyanines and reactive polyamides for the single-stage manufacture of pigment composition of the invention are those which are mentioned hereinbefore as suitable reactants in the condensation to provide polymeric phthalocyanine pigment derivatives according to the invention.

The proportion of the chloromethylated phthalocyanine to that of the flocculating phthalocyanine employed in the single-stage process for the production of the pigment composition of the invention may be within the range of from 0.5 to 25 percent by weight, more preferably from 1 to 15 percent by weight.

The flocculating phthalocyanine pigment may be employed in the form produced in any of its various stages of manufacture, for instance in crude form, as filter cake or presscake, or especially as dry powder or as acid-pasted or salt-ground pigmentary material. However, for reasons of economy, it is particularly preferred to use the flocculating phthalocyanine in crude form.

As in the production of the polymeric phthalocyanine derivatives of the invention, the polyamide is advantageously employed in the single-stage grind in considerable excess, over the stoichiometric proportion (calculated from the amine value) required to react with all of the chloromethyl groups of the chloromethylated phthalocyanine.

Any suitable milling method may be employed such as sand grinding, ball milling or Perl milling with the aid of corresponding grinding agents which include sand, gravel and glass beads.

Thus the production of a flocculation resistant pigment of the invention is conveniently effected by charging the flocculating phthalocyanine, the chloromethylated phthalocyanine, the polyamide and the grinding aid into a mill, and milling the mixture for a period, preferably within the range of from 5 to 100 hours, depending on the mill system used. The liquid milling is desirably effected in the presence of a diluting agent and at ambient temperature, that is at a temperature within the range of from 15° to 30° C., although higher temperatures can be used. Suitable diluting agents are those described hereinbefore as solvents suitable for use in conjunction with reactive polyamide in the preparation of the polymeric phthalocyanine derivatives of the invention. During the single-stage milling processes of the invention, the reactive polyamide and the chloromethylated phthalocyanine are caused to react together and the reaction product formed in situ is incorporated into the flocculating phthalocyanine all in the same operation. As a consequence, the milling process of the invention enjoys considerable economic advantages over known processes in which pre-formed non-flocculating phthalocyanines are separately incorporated into the flocculating phthalocyanine.

The pigment compositions produced according to the process of the present invention have high tinctorial power and exhibit excellent resistance to flocculation, for instance when incorporated into surface-coating compositions such as medium or long oil alkyd paints, melamine formaldehyde modified alkyd paints or acrylic paints.

The following examples further illustrate the present invention. Parts by weight bear the same relation to parts by volume as do kilograms to liters.

EXAMPLES 1 to 10

Eighteen parts by weight of dry crude monochloro copper phthalocyanine, 2 parts by weight of chloromethylated copper phthalocyanine (having a chlorine content in the range of from 13 to 16 percent by weight), a solution of 50 parts by weight of Versamid 140 (a reactive polyamide of amine value 350–400 milligrams KOH/g.) in 150 parts by weight of ethanol are ground with 650 parts by weight of gravel during 65 hours. At the end of this time, the mixture is washed through a coarse (60 mesh) sieve with ethanol, filtered, washed thoroughly with ethanol and acetone and dried.

The pigment composition so produced has high flocculation resistance in surface-coating compositions. A pigment composition produced when the chloromethylated copper phthalocyanine is replaced by 2 parts by weight of monochloro copper phthalocyanine, the remaining procedure being that described in Example 1, flocculates badly in the same surface-coating compositions.

Pigment compositions having similar excellent flocculation resistance in surface-coating compositions are obtained when Versamid 140 is replaced by 50 parts by weight of one of the following resins:

Versamid 125 (amine value 290–320 milligrams KOH/g)(Example 2)
Synolide 960 (amine value 360–400 milligrams KOH/g)(Example 3)
Ancamide 400 (amine value 400–440 milligrams KOH/g)(Example 4) Beckalide K189 (amine value 400–420 milligrams KOH/g)(Example 5)
Genamid 250 (amine value 245–450 milligrams KOH/g)(Example 6)
Casamid 167 (amine value 430–470 milligrams KOH/g)(Example 7)
Merginamide L490 (amine value 480–500 milligrams KOH/g)(Example 8)
Genamide 2000 (amine value 575–625 milligrams KOH/g) (Example 9) Wolfamid 4 (Amine value 360–400 milligrams KOH/g) (Example 10)

EXAMPLE 11

Nineteen parts by weight of dry crude monochloro copper phthalocyanine, 1 part by weight of chloromethylated copper phthalocyanine (having a chlorine content in the range from 13 to 16 percent by weight), a solution of 50 parts by weight of Versamid 140 (a reactive polyamide of amine value 350–400 milligrams KOH/g.) in 150 parts by weight of ethanol are ground with 650 parts by weight of gravel for 65 hours. At the end of this time, the mixture is washed through a coarse (60 mesh) sieve with ethanol, filtered, washed thoroughly with ethanol and acetone and dried.

The pigment composition so produced has high flocculation resistance in surface-coating compositions. A pigment composition produced when the chloromethylated copper phthalocyanine is replaced by 2 parts by weight of monochloro copper phthalocyanine, the remaining procedure being that described in Example 1, flocculates badly in the same surface-coating compositions.

EXAMPLES 12 and 13

Eighteen parts by weight of dry crude monochloro copper phthalocyanine,
two parts by weight of chloromethylated copper phthalocyanine (having a chlorine content of 15 percent by weight), and
fifty parts by weight of Genamid 2000 in,
one hundred and fifty parts by weight of acetone
are ground with 650 parts by weight of gravel for 65 hours. At the end of this time the sample is recovered as in Example 1. The resulting pigment has excellent resistance to flocculation in surface-coating compositions. Pigment produced in a similar experiment, but in which the chloromethylated copper phthalocyanine is replaced by 2 parts by weight of crude monochloro copper phthalocyanine flocculates badly in the same coating compositions.

A flocculation-resistant pigment is also obtained when the acetone of Example 12 is replaced by methanol (Example 13).

EXAMPLE 14

Eighteen parts by weight of crude monochloro copper phthalocyanine, 2 parts by weight of chloromethylated copper phthalocyanine (having a chlorine content of 15 percent by weight), a solution of 40 parts by weight of Versamid 140 in 160 parts by weight of nitrobenzene are ground with 650 parts by weight of gravel for 65 hours. At the end of this time, the mixture is washed thoroughly through a 60 mesh sieve with ethanol to remove the gravel. Afterwards the pigment is separated by filtration, washed thoroughly with ethanol and dried.

The pigment composition so produced has good flocculation-resistance and high tinctorial power in coating compositions.

A pigment produced when the chloromethylated copper phthalocyanine is replaced by 2.0 parts by weight of monochloro copper phthalocyanine, the remaining procedure being the described in the above example, has poor flocculation resistance and lower tinctorial power.

EXAMPLE 15

Eighteen parts by weight of dry crude monochloro copper phthalocyanine,
two parts by weight of chloromethylated copper phthalocyanine (having a chlorine content of 13 percent by weight,
fifty parts by weight of Versamid 140 in,
one hundred and fifty parts by weight of ethanol, and
six hundred parts by weight of glass beads
are charged to a Drais Perl milled at low speed for 6 hours. The pigment is then separated from the beads, filtered, washed thoroughly with ethanol and acetone and dried.

The pigment composition thus obtained has high tinctorial power and excellent resistance to flocculation in surface-coating compositions.

EXAMPLES 16 to 19

Eighteen parts by weight of crude monochloro copper phthalocyanine, 2 parts by weight of chloromethylated copper phthalocyanine (having a chlorine content of 10 percent by weight), a solution of 100 parts by weight of Versamid 140, a reactive polyamide resin having an amine value of 350–400 milligrams KOH/g, in 100 parts by weight of ethanol are ground with 650 parts by weight of gravel for 65 hours. At the end of this time, the mixture is washed thoroughly through a coarse (60 mesh) sieve with ethanol, filtered, washed thoroughly with ethanol and acetone and dried.

The pigment composition so produced has high flocculation-resistance in surface-coating compositions. A pigment composition produced when the chloromethylated copper phthalocyanine is replaced by 2.0 parts by weight of monochloro copper phthalocyanine, the remaining procedure being that described in Example 16, flocculates badly in the same surface-coating compositions.

Pigment compositions having similar excellent flocculation-resistance in surface-coating compositions are obtained when:
a. a solution of 50 parts by weight of reactive polyamide resin in 150 parts by weight of ethanol is employed, the remaining conditions being the same as Example 16 (Example 17), or
b. a solution of 18 parts by weight of the reactive polyamide resin in 182 parts by weight of ethanol is employed, the remaining conditions being as defined in Example 16 (Example 18), or
c. the ethanol solvent in Example 16 is entirely replaced by the same amount of isopropanol (Example 19).

EXAMPLE 20

Eighteen parts by weight of crude monochloro copper phthalocyanine, two parts by weight of chloromethylated copper phthalocyanine (having a chlorine content of 15 percent by weight), and twenty parts by weight of Genamid 250 in 180 parts by weight of ethanol are milled with, six hundred and fifty parts by weight of gravel for 65 hours.

At the end of this time the pigment produced is recovered as in Example 1. It has excellent resistance to flocculation in surface-coating compositions.

EXAMPLE 21

A. Twenty parts by weight of chloromethylated copper phthalocyanine having a chlorine content of 12 percent by weight, 50 parts by weight of Genamid 250 and 200 parts by weight of nitrobenzene are ground with 650 parts by weight of gravel for 65 hours. At the end of this time the slurry is separated from the gravel by passing it through a 60 mesh sieve and washing with 500 parts by weight of nitrobenzene.

B. A sample of a nitrobenzene slurry containing 25 parts by weight of monochloro copper phthalocyanine is stirred with 50 parts by weight of 98 percent sulphuric acid for 2 hours at 60° C. The mixture is then drowned out into 1,000 parts by weight of water, the nitrobenzene and pigment coalesce and this pigment/nitrobenzene mass is washed by successive washings and decantations until the pH of the aqueous phase is about 4. The pH is then raised to 7 by addition of aqueous sodium hydroxide solution. The aqueous phase is finally decanted off.

C. Forty parts by weight of the nitrobenzene slurry obtained by grinding chloromethyl copper phthalocyanine with Genamid 250 according to the above paragraph A are added to the phthalocyanine/nitrobenzene mass prepared according to paragraph B and the new mixture is refluxed with stirring for 8 hours. Afterwards the nitrobenzene is removed by steam distillation and the pigment is filtered off, washed with water and dried.

The pigment thus produced has high tinctorial power and better resistance to flocculation than a pigment prepared in a similar manner but from which the chloromethylated copper phthalocyanine has been omitted.

EXAMPLE 22

Eighteen parts by weight of dry crude copper phthalocyanine, two parts by weight of chloromethylated copper phthalocyanine (having a chlorine content of 15% by weight), and fifty parts by weight of Genamid 250 in 150 parts by weight of ethanol, are ground with six hundred and fifty parts by weight of gravel for 65 hours.

At the end of this time the charge is washed through a 60-mesh sieve, filtered, thoroughly washed with ethanol and acetone and dried.

The pigment thus produced has better flocculation-resistance than a pigment produced in a similar experiment, but in which the chloromethylated copper phthalocyanine is replaced by 2 parts by weight of crude copper phthalocyanine.

EXAMPLE 23

Sixty-seven parts by weight of crude monochloro copper phthalocyanine in the form of a filtercake of which the liquid phase is nitrobenzene and containing 30 percent by weight of solid, 2 parts by weight of chloromethylated copper phthalocyanine (having a chlorine content of 15 percent by weight) and 40 parts by weight of Versamid 140 in 150 parts by weight of nitrobenzene are ground with 650 parts by weight of sand for 100 hours. The sand is then removed by passing the discharged mass through a 60-mesh sieve; the slurry is then filtered, washed thoroughly with ethanol and acetone and dried.

The pigment thus produced has high tinctorial power and excellent flocculation-resistance in surface coating compositions.

EXAMPLE 24

Eighteen parts by weight of dry crude metal-free phthalocyanine, 2 parts by weight of chloromethylated copper phthalocyanine (having a chlorine content of 12 percent by weight) and 50 parts by weight of Genamid 250 in 150 parts by weight of ethanol are ground with 650 parts by weight of sand for 65 hours. The sand is then removed by passing the mass through a 60-mesh sieve; the slurry is then filtered and washed thoroughly with ethanol and acetone and dried.

The resulting pigment has high tinctorial power and excellent resistance to flocculation in surface coating compositions. A pigment prepared in an identical manner, but from which the chloromethylated copper phthalocyanine has been omitted flocculates badly.

What we claim is:

1. An anti-flocculation pigment additive consisting essentially of a polymeric phthalocyanine pigment derivative comprising a copper phthalocyanine nucleus linked through methylene groups to polyamide resins derived from polyamides having at least one reactive amino group and an amine value of 250–650 milligrams of potassium hydroxide per gram of polyamide.

2. A process of producing a pigment composition comprising milling together in a single stage a liquid mixture comprising a phthalocyanine pigment having a tendency to flocculate with a minor proportion of the additive as defined in claim 1.

3. The process as claimed in claim 1 wherein the diluting agent is an aliphatic alcohol or ketone.

4. The additive as claimed in claim 1 wherein the methylene groups are present in an amount corresponding to 10–30 percent by weight, based on the weight of the phthalocyanine residue, of chlorine atoms linked to the phthalocyanine nucleus through the methylene groups in chloromethylated copper phthalocyanine.

5. A pigment composition comprising a phthalocyanine pigment having a tendency to flocculate and a minor proportion of the additive as claimed in claim 1.

6. The pigment composition as claimed in claim 5 wherein a minor proportion of unreacted chloromethylated phthalocyanine and reactive polyamide are also present.

7. A process of producing a pigment composition as defined in claim 5 comprising intimately milling together in a single stage a liquid mixture comprising phthalocyanine pigment having a tendency to flocculate with a minor proportion of the additive.

8. The process as claimed in claim 7 wherein the flocculating phthalocyanine pigment is monochloro copper phthalocyanine.

9. The process as claimed in claim 7 wherein the flocculating phthalocyanine contains from 0 to 10 percent chlorine.

10. The process as claimed in claim 7 wherein the flocculating phthalocyanine is a metal-free phthalocyanine pigment.

11. The process as claimed in claim 7 wherein the quantity of additive corresponds to 1–15 percent by weight, based on the weight of the flocculating phthalocyanine pigment, of the chloromethylated copper phthalocyanine.

12. The process as claimed in claim 7 wherein the flocculating phthalocyanine pigment is in crude form.

13. The process as claimed in claim 8 wherein the milling is conducted in the presence of a diluting agent at a temperature within the range of from 15° to 30°C.

* * * * *